US012752407B2

(12) United States Patent
Sailing, Sr.

(10) Patent No.: US 12,752,407 B2
(45) Date of Patent: Oct. 6, 2026

(54) FASTENER REMOVAL TOOLS AND METHODS

(71) Applicant: The Boeing Company, Arlington, VA (US)

(72) Inventor: John D. Sailing, Sr., Covington, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/754,524

(22) Filed: Jun. 26, 2024

(65) Prior Publication Data

US 2026/0001203 A1 Jan. 1, 2026

(51) Int. Cl.
*B25B 27/14* (2006.01)

(52) U.S. Cl.
CPC .................................... *B25B 27/14* (2013.01)

(58) Field of Classification Search
CPC .............. B25B 27/14; B25B 7/04; B25B 7/22
USPC ............................................................ 81/423
See application file for complete search history.

(56) References Cited

U.S. PATENT DOCUMENTS

| | | | | |
|---|---|---|---|---|
| 404,811 | A * | 6/1889 | Wichelhaus | F42B 33/12 81/426 |
| 638,378 | A * | 12/1899 | Casterlin | B25B 5/12 81/394 |
| 1,617,354 | A * | 2/1927 | Elbert | B23K 11/3018 219/85.14 |
| 1,923,199 | A * | 8/1933 | Hackney | B25B 27/005 81/426 |
| 2,477,727 | A * | 8/1949 | Engberg | B21D 7/063 72/473 |
| 2,755,541 | A | 7/1956 | Kruger | |
| 2,814,222 | A | 11/1957 | Sanders | |
| 4,240,190 | A | 12/1980 | Bray | |
| 5,316,512 | A * | 5/1994 | Ell | B25B 7/08 445/61 |
| 5,511,297 | A | 4/1996 | Cross | |
| 5,884,540 | A | 3/1999 | Mo | |
| 6,256,855 | B1 * | 7/2001 | Schall | B25B 7/02 81/463 |
| 6,966,550 | B2 * | 11/2005 | Marks | B25B 5/067 81/324 |
| 7,581,469 | B1 | 9/2009 | Clayborn | |
| 7,717,017 | B2 * | 5/2010 | McBride | B25B 7/00 30/177 |
| 8,161,789 | B2 | 4/2012 | Battenfeld et al. | |
| 8,176,814 | B1 | 5/2012 | Bernstein et al. | |

(Continued)

FOREIGN PATENT DOCUMENTS

CN 218556757 3/2023

*Primary Examiner* — Hadi Shakeri
(74) *Attorney, Agent, or Firm* — Walters & Wasylyna LLC

(57) ABSTRACT

A fastener removal tool includes a first lever and a second lever. The first lever includes a first handle and a first jaw. The second lever is pivotally coupled to the first lever and includes a second handle and a second jaw. The first lever and the second lever are configured for pivoting to move the first jaw and the second jaw between an open position and a closed position. The first jaw includes a first arm and a first prong extending at least approximately perpendicular from the first arm. The second jaw includes a second arm and a second prong extending at least approximately perpendicular from the second arm.

20 Claims, 9 Drawing Sheets

(56) References Cited

U.S. PATENT DOCUMENTS

| | | | |
|---|---|---|---|
| 10,414,032 | B2 | 9/2019 | Yuntz et al. |
| 2010/0101379 | A1 | 4/2010 | Hoffman et al. |

* cited by examiner

FASTENER REMOVAL TOOLS AND METHODS

FIELD

The present disclosure relates generally to tools and, more particularly, to specialty tools and methods for removing fasteners.

BACKGROUND

Various types of fasteners are used in assembly operations, and it is sometimes desirable to remove a fastener. For example, in some assembly operations, it is desirable to temporarily secure two components together before installing a permanent fastener. In an aerospace example, a sheet of material (e.g., an aircraft skin) is temporarily secured in place over a frame (e.g., aircraft frame) to align it before making a permanent fastening of the sheet of material to the frame. However, conventional tools and methods for removing these temporary fasteners tend to damage the fasteners. Furthermore, removing temporary fasteners from areas with limited access can be challenging. Accordingly, those skilled in the art continue with research and development efforts in fastener removal tools and methods.

SUMMARY

Disclosed are examples of a tool, an end attachment for a tool, and a method for removing a fastener. The following is a non-exhaustive list of examples, which may or may not be claimed, of the subject matter according to the present disclosure.

In an example, the disclosed tool includes a first lever and a second lever. The first lever includes a first handle and a first jaw. The second lever is pivotally coupled to the first lever and includes a second handle and a second jaw. The first lever and the second lever are configured for pivoting to move the first jaw and the second jaw between an open position and a closed position. The first jaw includes a first arm and a first prong extending at least approximately perpendicular from the first arm. The second jaw includes a second arm and a second prong extending at least approximately perpendicular from the second arm.

In an example, the disclosed end attachment includes a first jaw configured for connecting to a first lever of a tool and a second jaw configured for connecting to a second lever of the tool. The first jaw includes a first arm and a first prong extending at least approximately perpendicular from the first arm. The second jaw includes a second arm and a second prong extending at least approximately perpendicular from the second arm.

In an example, the disclosed method includes steps of: (1) positioning a head of a fastener between a first jaw and a second of a tool; (2) positioning a first prong of the first jaw between the head of the fastener and a surface to which the fastener is fastened; (3) positioning a second prong of the second jaw between the head of the fastener and the surface; (4) receiving a portion of a shank of the fastener by an arcuate recess of the second prong; and (5) applying a force to the tool to remove the fastener from the surface.

Other examples of the tool, the end attachment, and the method will become apparent from the following detailed description, the accompanying drawings, and the appended claims.

DETAILED DESCRIPTION

Figure 1:
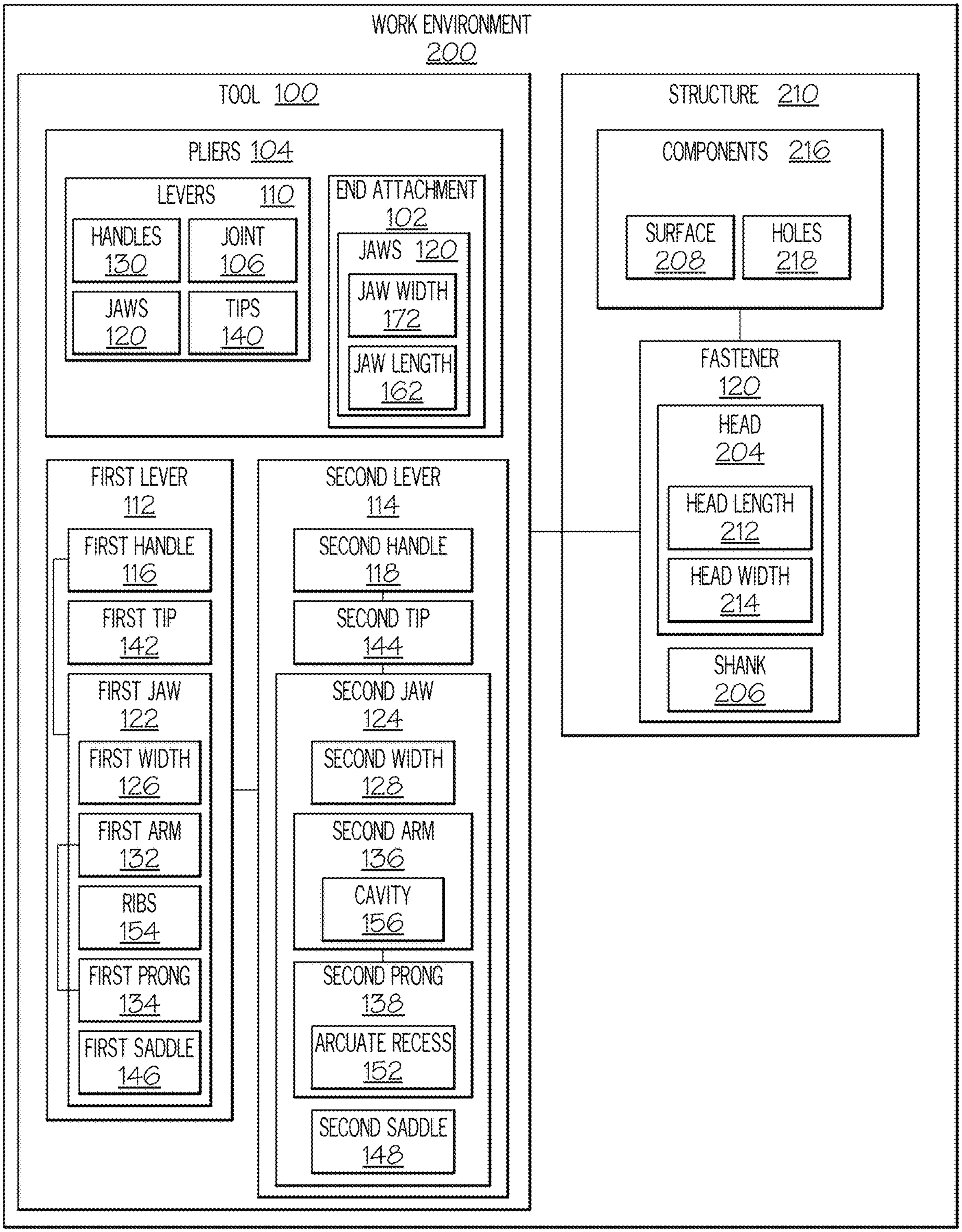
FIG. 1 is a schematic block diagram of an example of a tool for removing a fastener.

Referring generally to FIGS. 1-8, by way of examples, the present disclosure is directed to a tool 100 for removing a fastener. The present disclosure is also directed to an end attachment 102 for a fastener removal tool. The present disclosure is further directed to a method 1000 for removing a fastener.

Generally, examples of the tool 100 and/or the end attachment 102 take the form of a pair of pliers (e.g., pliers 104) that include a pair of extended jaws (e.g., jaws 120). The jaws are configured for gripping and supporting a fastener (e.g., fastener 202) during removal of the fastener. With the tool 100 in the closed, or gripping, position, the jaws are configured to conform around an end of the fastener such that the surface area of engagement between the jaws and the fastener is sufficient for application of a tension, or pulling, force on the fastener sufficient for removal.

Throughout the present disclosure, the fastener 202 refers to any one of various types of mechanical fasteners used to temporarily or permanently secure two or more components 216 of a structure 210 together. Generally, the fastener 202 includes components common to fasteners of the type, such as a head 204 and a shank 206 (FIGS. 1, 7 and 8) that extends from the head 204 along a longitudinal axis of the fastener 202. The shank 206 is configured (e.g., sized and shaped) for insertion through aligned holes 218 formed in the components 216 being secured together. The head 204 is configured (e.g., sized and shaped) to distribute a clamping force on the components 216 being secured and to serve as a contact point for the tool 100 during installation and removal. In the illustrative examples, the fastener 202 is described and illustrated as a temporary fastener, such as Centrix temporary fasteners, Cleco temporary fasteners, and the like, used to temporarily hold components 216 together while installing permanent fasteners. In these examples, the tool 100 and/or the end attachment 102 are configured and intended for removal of such temporary fasteners. However, in other examples, the tool 100 and/or the end attachment 102 are configured and intended for removal of various other types of fasteners, such as permanent fasteners needing to be removed and/or replaced.

Referring now to FIGS. 1 and 3-8, the following describes various examples of the tool 100, according to the present disclosure. The tool 100 includes a number of elements, features, and components, including one or more of a pair of levers 110, a joint 106, a pair of handles 130, a pair of jaws 120, a pair of tips 140, the end attachment 102, a first lever 112, a first handle 116, a first jaw 122, a first arm 132, a first prong 134, ribs 154, a second lever 114, a second jaw 124, a second arm 136, a second prong 138, an arcuate recess 152, a first tip 142, and a second tip 144. The following also describes various examples of the end attachment 102 for a fastener removal tool. In one or more examples, the fastener removal tool is an example of the tool 100 and the end attachment 102 is an example of the first jaw 122 and the second jaw 124, which are configured for connection to and removal from the levers 110 of the tool 100. Not all of the elements, features, and/or components described or illustrated in one example are required in that example. Some or all of the elements, features, and/or components described or illustrated in one example can be combined with other examples in various ways without the need to include other elements, features, and/or components described in those other examples, even though such combination or combinations are not explicitly described or illustrated by example herein.

Figure 3:
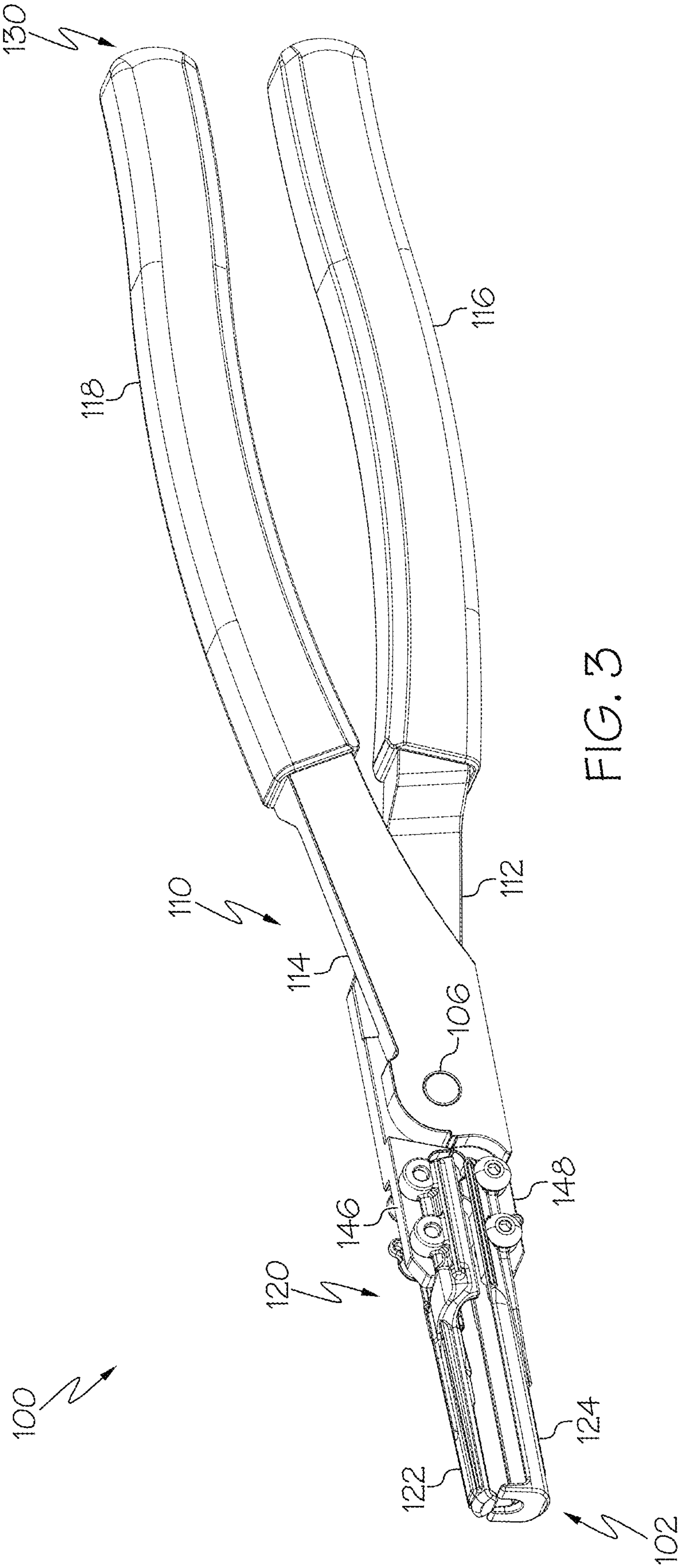
FIG. 3 is a schematic, perspective view of an example of the tool.
Figure 4:
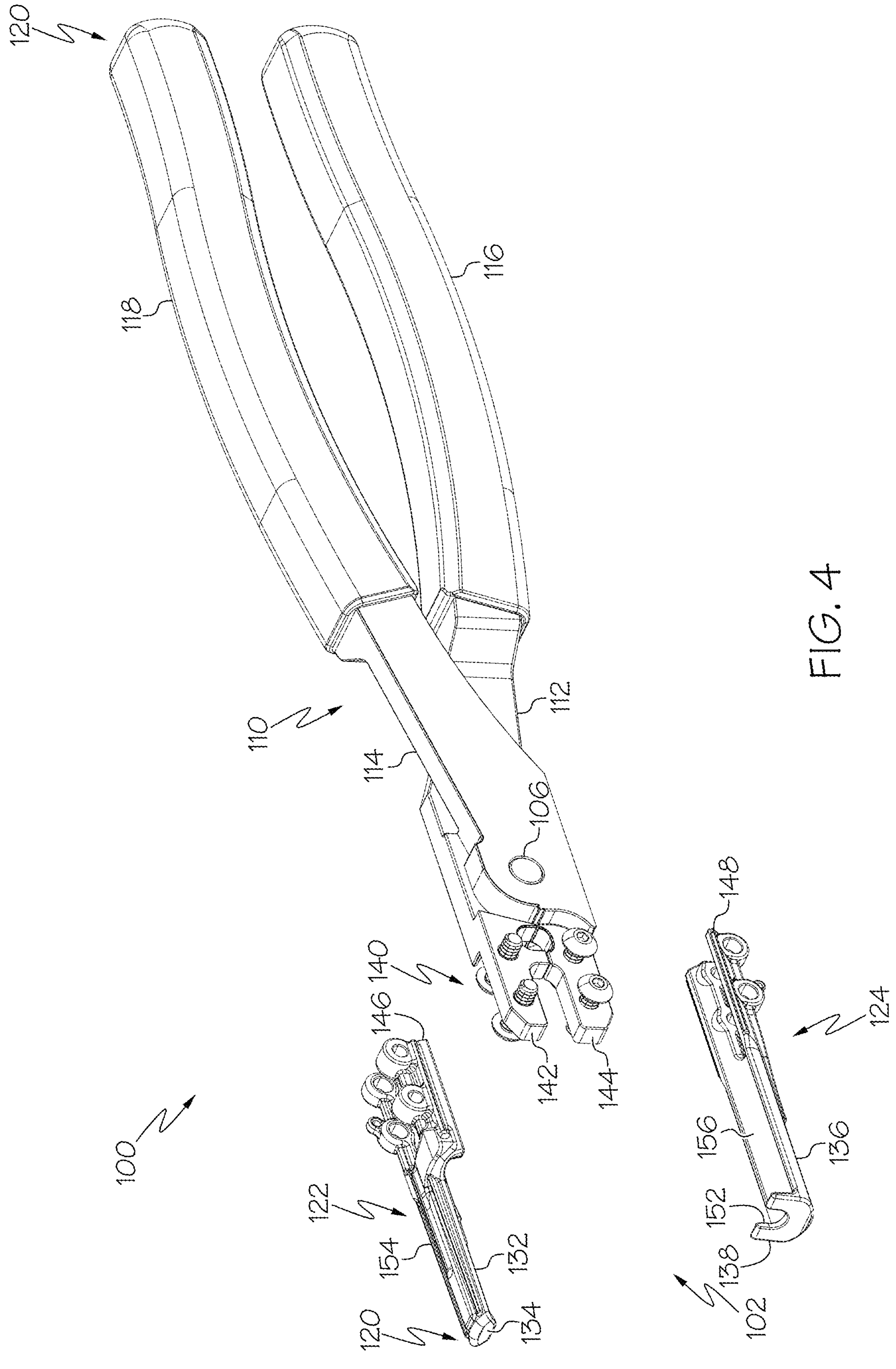
FIG. 4 is a schematic, perspective, exploded view of an example of the tool.
Figure 5:
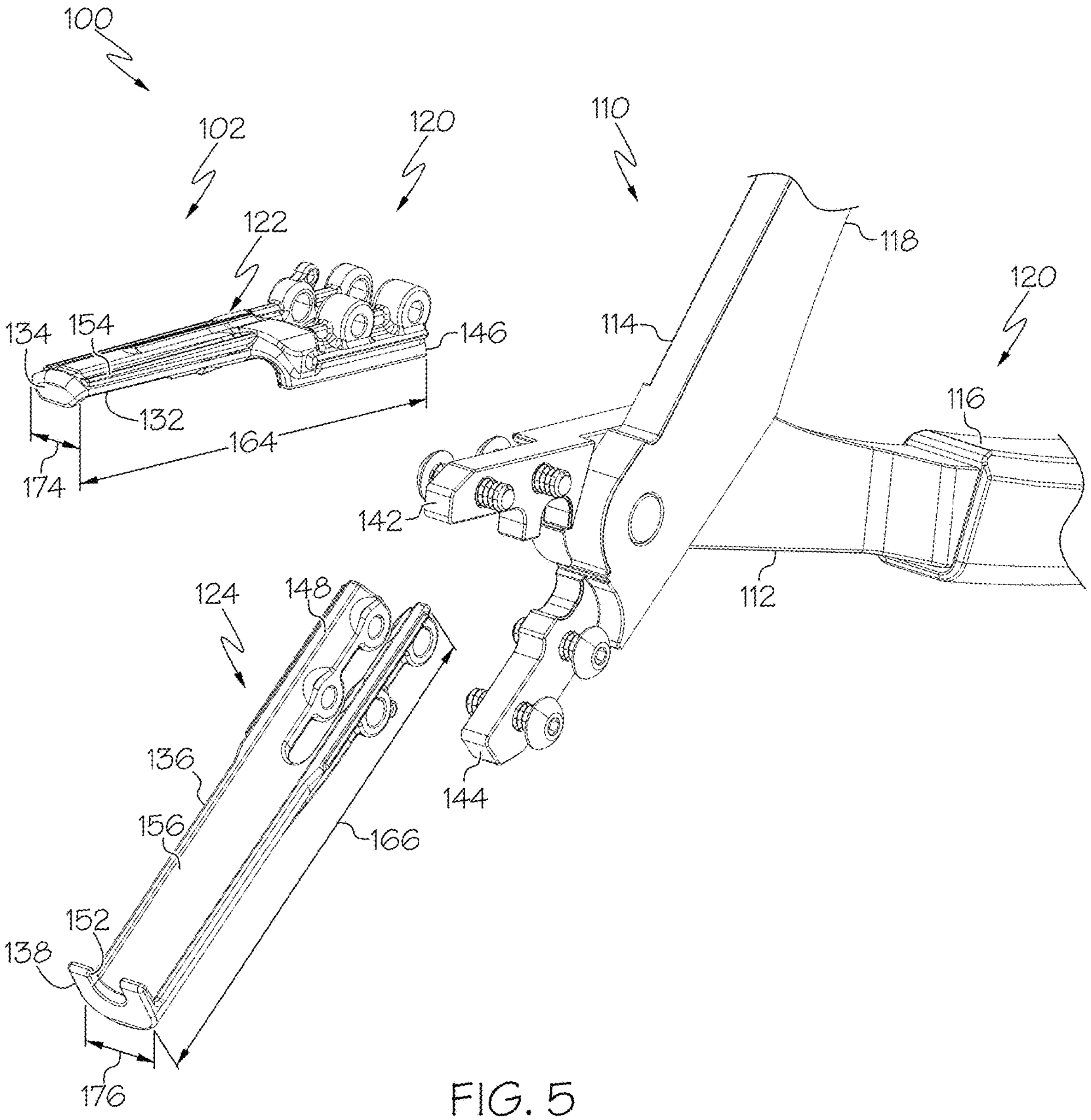
FIG. 5 is a schematic, perspective, exploded view of an example of the tool in an open configuration.
Figure 6B:
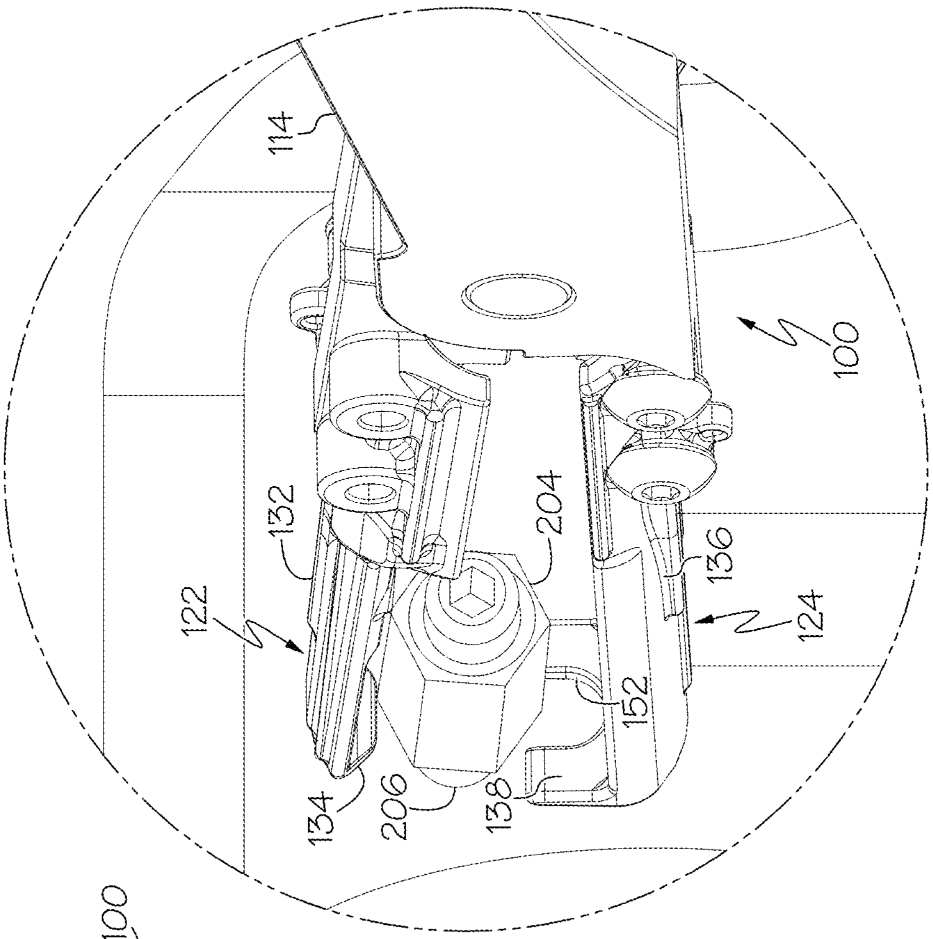
FIG. 6B is a schematic, enlarged perspective view of a portion the tool shown in FIG. 6A.
Figure 6A:
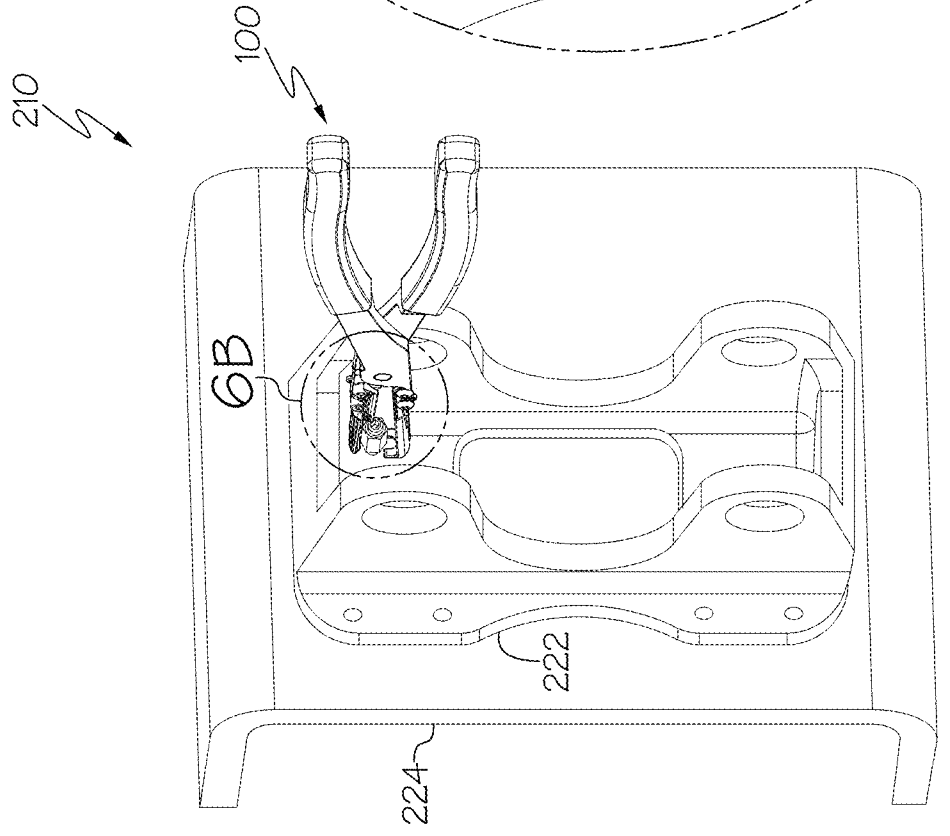
FIG. 6A is a schematic, perspective, environmental view of an example of the tool.
Figure 7:
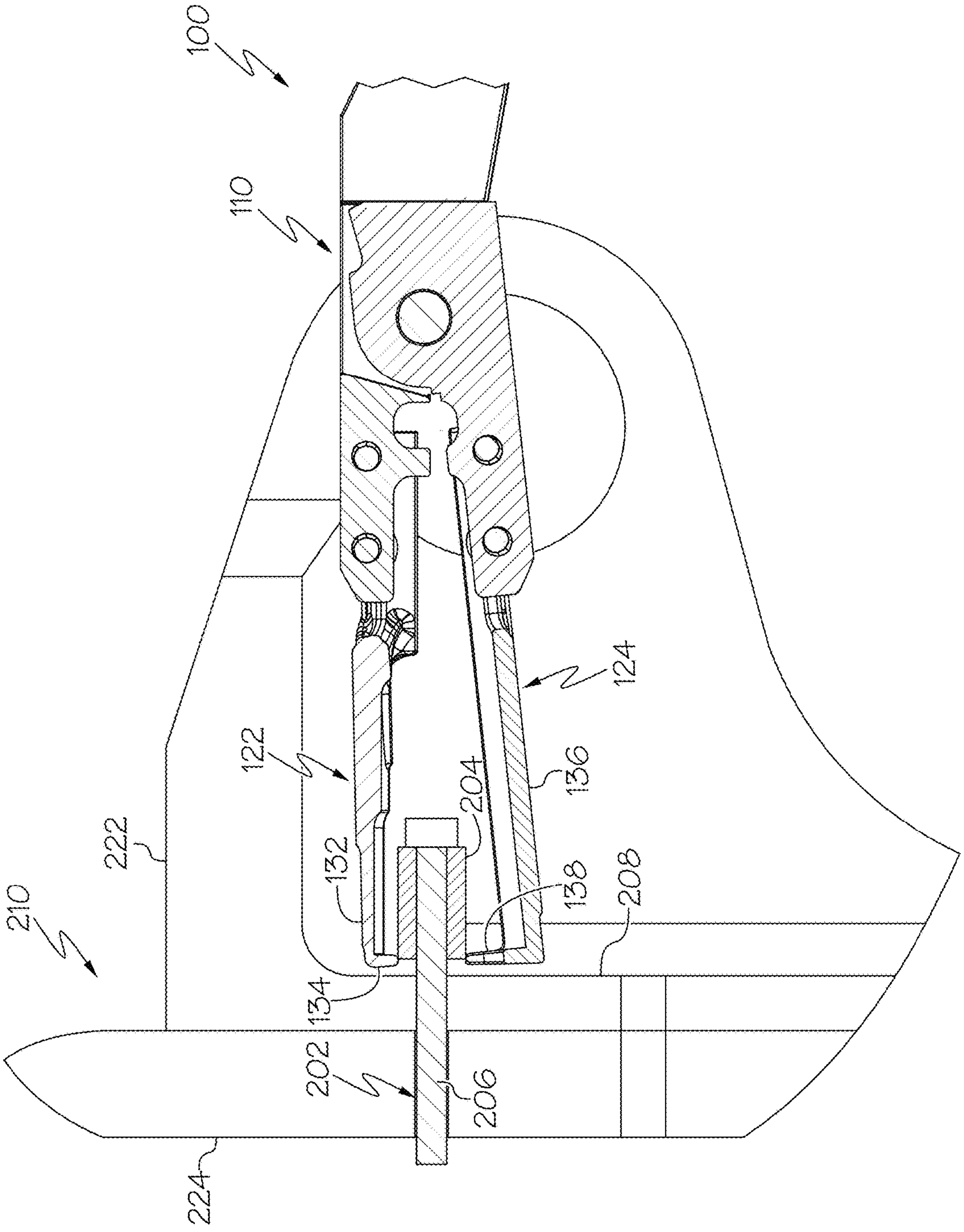
FIG. 7 is a schematic, elevation, environmental view of an example of the tool.
Figure 8:
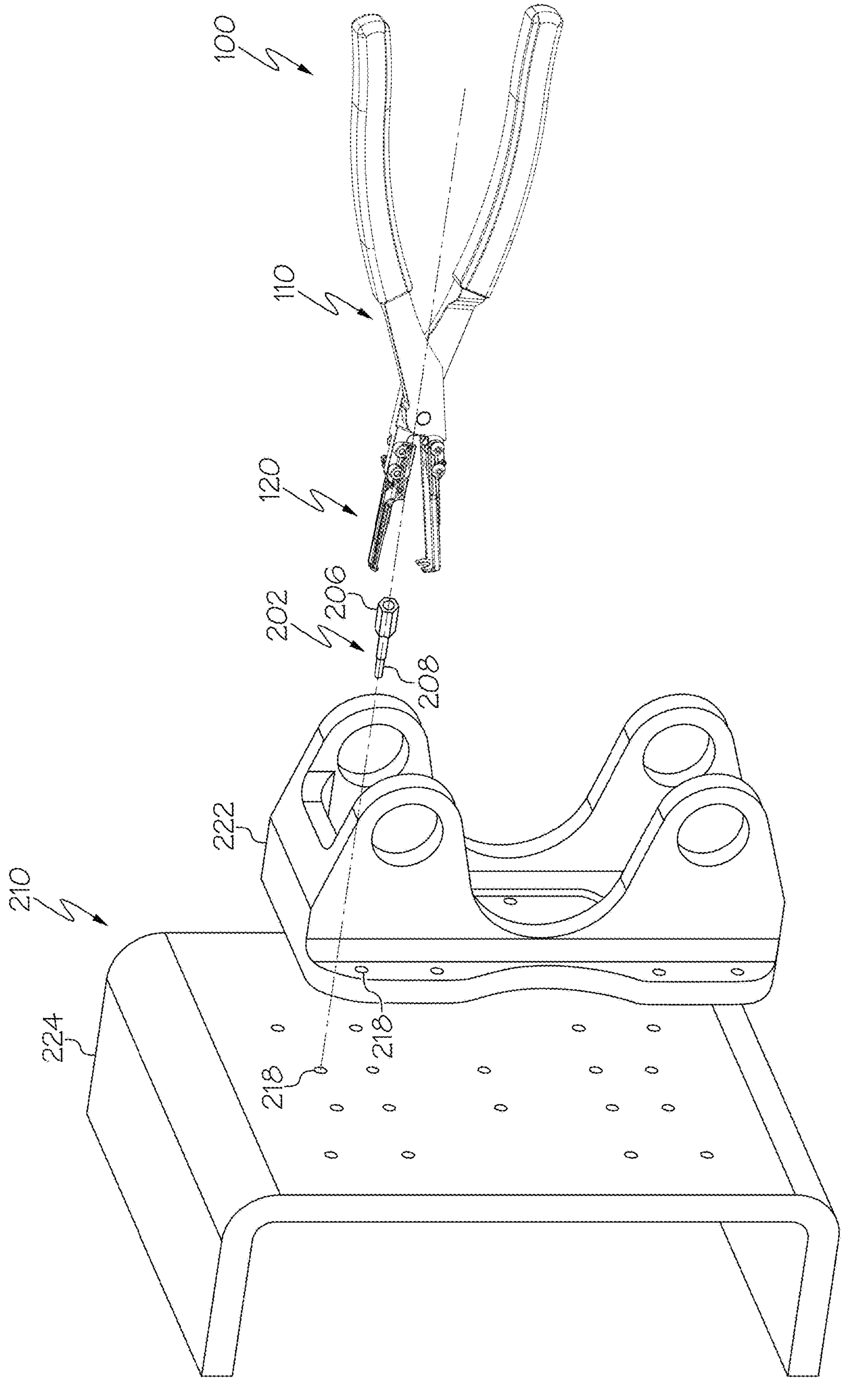
FIG. 8 is a schematic, perspective, environmental view of an example of the tool.
Figure 9:
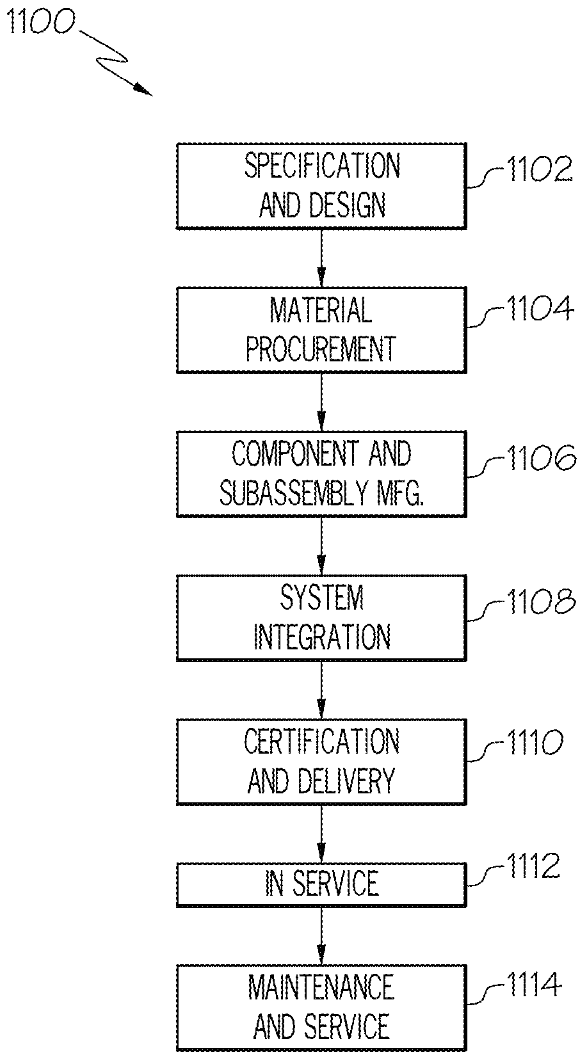
FIG. 9 is a flow diagram of an example of an aircraft manufacturing and service method.

FIGS. 3-5 illustrate examples of the tool 100. Generally, the tool 100 includes a pair of levers 110 that are pivotally coupled together. The first lever 112 includes the first handle 116 and the first jaw 122. The second lever 114 includes the second handle 118 and the second jaw 124. The second lever 114 is pivotally coupled to the first lever 112. For example, the first lever 112 and the second lever 114 are coupled together by the joint 106 (e.g., pin or other pivot joint). The first lever 112 and the second lever 114 are configured for pivoting to move the first jaw 122 and the second jaw 124 between an open position and a closed position.

FIGS. 6A, 6B, 7 and 8 illustrate examples of the tool 100 relative to a work environment 200, for example, in use during removal of the fastener 202 from the components 216 of the structure 210. In these examples, the fastener 202 is a temporary fastener used to hold the components 216 in place while forming additional holes or installing permanent fasteners.

In one or more examples, during an assembly operation, a first component 222 and a second component 224 each have a number of holes 218. The components 216 are positioned such that the holes 218 are aligned and the components 216 are then secured in place by inserting one or more of the fasteners 202 through the components 216. Once properly aligned and secured by the fasteners 202, permanent fasteners are installed. After installation of the permanent fasteners, the fasteners 202 are removed using the tool 100 and, optionally, replaced by permanent fasteners.

In one or more examples, the tool 100 is a plier-type tool that operates by manually grasping the tool 100 in the hand and squeezing the handles 130 together. For example, squeezing the handles 130 together closes the jaws 120. As will be described herein, in one or more examples, the jaws 120 are coupled to the handles 130 (e.g., pliers 104 with the end attachment 102). In one or more other examples, the jaws 120 are integral with the handles 130.

In one or more examples, the tool 100 takes the form of pliers 104. In one or more examples, the levers 110 form the handles 130 at the gripping end of the tool 100 and the jaws 120 that extend from the handles 130 at the working end of the tool 100. In one or more examples, the jaws 120 are separate from the levers 110 and are configured to be coupled to the levers 110 as the end attachment 102.

In the illustrated examples, jaws 120 of the tool 100 (e.g., the first jaw 122 and the second jaw 124) take the form of the end attachment 102 that is coupled to the tips 140 of the handles 130. In these examples, the first jaw 122 and the second jaw 124 are configured to be coupled to respective working ends of the first lever 112 and the second lever 114. Once connected to the levers 110 of the tool 100, the jaws 120 (e.g., first jaw 122 and second jaw 124) extend from or form the respective working ends of the levers 110 (e.g., first lever 112 and second lever 114).

In other examples, the tool 100 is a plier-type tool that operates by automatically manipulating the end attachment 102 (e.g., jaws 120) using a robotic manipulator, an end effector, a robot, a collaborative robot (cobot), or other computer controlled or instructed machine. In these examples, the jaws 120 are coupled to actuators or other automated or semi-automated manipulators for positioning and articulating the jaws 120.

Referring to FIGS. 1, 4 and 5, in one or more examples, the first lever 112 includes the first tip 142 at the working end of the first lever 112, opposite the first handle 116. The first jaw 122 is coupled to the first tip 142. In one or more examples, the first tip 142 of the tool 100 is modified for attachment of the first jaw 122. In one or more examples, the first jaw 122 is configured for attachment to the first tip 142 of the tool 100.

Referring to FIGS. 1, 4 and 5, in one or more examples, the second lever 114 includes the second tip 144 at the working end of the second lever 114, opposite the second handle 118. The first jaw 122 is coupled to the first tip 142. In one or more examples, the second tip 144 of the tool 100 is modified for attachment of the second jaw 124. In one or more examples, the second jaw 124 is configured for attachment to the second tip 144 of the tool 100.

In other examples, jaws 120 (e.g., first jaw 122 and second jaw 124) are integral components of the tool 100. In these examples, the first jaw 122 extends from or forms the working end of the first lever 112 and the second jaw 124 extends from or forms the working end of the second lever 114.

As such and unless otherwise specifically indicated, throughout the present disclosure, reference to the tool 100 may refer to examples in which the jaws 120 (e.g., first jaw 122 and second jaw 124) are integral to the levers 110 and form the working end of the tool 100 or examples in which the jaws 120 (e.g., first jaw 122 and second jaw 124) are the end attachments 102 that are coupled to the levers 110 to form the working end of the tool 100. Similarly, unless otherwise specifically indicated, throughout the present disclosure, reference to the jaws 120 (e.g., first jaw 122 and second jaw 124) may refer to examples in which the jaws 120 (e.g., first jaw 122 and second jaw 124) are integral components of the tool 100 or examples there the jaws 120 (e.g., first jaw 122 and second jaw 124) take the form of the end attachments 102.

Referring to FIGS. 1 and 3-5, in one or more examples, the first jaw 122 includes the first arm 132 and the first prong 134. The first jaw 122 extends from the end of the first lever 112 opposite the first handle 116 and forms a first portion of the working end of the tool 100. The first arm 132 is configured for engaging and accommodating the head 204 of the fastener 202 when the tool 100 is in the closed position. The first prong 134 extends from the first arm 132. In one or more examples, the first prong 134 is at least approximately perpendicular to the first arm 132. The first prong 134 is configured to fit between the head 204 of the fastener 202 and a surface 208 to which the fastener 202 is secured when the tool 100 is in the closed position.

Referring to FIGS. 1 and 3-5, in one or more examples, the second jaw 124 includes the second arm 136 and the second prong 138. The second jaw 124 extends from the end of the second lever 114 opposite the second handle 118 and forms a second portion of the working end of the tool 100. The second arm 136 is configured for engaging and accommodating the head 204 of the fastener 202 when the tool 100 is in the closed position. The second prong 138 extends from the second arm 136. In one or more examples, the second prong 138 is at least approximately perpendicular to the second arm 136. The second prong 138 is configured to fit between the head 204 of the fastener 202 and the surface 208 to which the fastener 202 is secured when the tool 100 is in the closed position.

Referring to FIGS. 1 and 3-5, in one or more examples, the first jaw 122 is coupled to and is removable from the first handle 116 and the second jaw 124 is coupled to and is removable from the second handle 118. In one or more examples, the first jaw 122 includes a first saddle 146 and the second jaw 124 includes a second saddle 148. The first saddle 146 enables attachment of the first jaw 122 to the first handle 116. The second saddle 148 enables attachment of the second jaw 124 to the second handle 118. In one or more examples, the first saddle 146 is configured for engaging the end of the first lever 112 opposite the first handle 116. In one or more examples, the second saddle 148 is configured for engaging the end of the second lever 114 opposite the second handle 118.

As illustrated in FIGS. 3-5, in one or more examples, the first saddle 146 is configured (e.g., sized and shaped) to fit over or otherwise accommodate at least a portion of the first tip 142 of the first lever 112. The first saddle 146 and the first tip 142 are coupled together using one or more mechanical fasteners (e.g., threaded fasteners). Similarly, the second saddle 148 is configured (e.g., sized and shaped) to fit over or otherwise accommodate at least a portion of the second tip 144 of the second lever 114. The second saddle 148 and the second tip 144 are coupled together using one or more mechanical fasteners (e.g., threaded fasteners).

Referring to FIGS. 1 and 3-5, in one or more examples, the first jaw 122 includes one or more ribs 154. In one or more examples, the ribs 154 extend outwardly from and run along a length of the first arm 132. The ribs 154 are configured to stiffen and/or strengthen the first arm 132 (e.g., stiffening ribs) and resist bending and/or twisting of the first jaw 122 when applying a pulling force to the fastener 202 to remove the fastener 202.

Referring to FIGS. 3 and 6A-8, in one or more examples, in the closed position, the first arm 132 and the second arm 136 are at least approximately parallel to one another. The relative position and orientation of the first arm 132 and the second arm 136 enable the jaws 120 to engage the head 204 of the fastener 202 at multiple (e.g., diametrically opposed) locations when the tool 100 is in the closed position for applying the pulling force to the fastener 202.

Referring to FIGS. 3 and 6A-8, in one or more examples, in the closed position, the first prong 134 and the second prong 138 are at least approximately parallel to one another. In one or more examples, in the closed position, the first prong 134 and the second prong 138 are at least approximately aligned with one another or reside in common virtual plane. The relative position and orientation of the first prong 134 and the second prong 138 enable the jaws 120 to engage the head 204 of the fastener 202 at multiple locations when the tool 100 is in the closed position for applying the pulling force to the fastener 202.

Referring to FIGS. 3-5 and 7, in one or more examples, the first prong 134 is tapered. Tapering of the first prong 134 enables the first prong 134 to serve as a wedge that initially urges the fastener 202 out from the hole 218 and begins to separate the head 204 of the fastener 202 from the surface 208 when closing the tool 100 around the head 204 of the fastener 202. Similarly, in one or more examples, the second prong 138 is tapered. Tapering of the second prong 138 enables the second prong 138 to serve as a wedge that initially urges the fastener 202 out from the hole 218 and begins to separate the head 204 of the fastener 202 from the surface 208 when closing the tool 100 around the head 204 of the fastener 202.

Generally, the first arm 132 and/or the second prong 138 are inwardly tapered from the base (e.g., at a respective arm of the jaw) to the tip of the prong. For example, the first arm 132 and the second prong 138 have a first width at the base and second width at the tip, which is less than the first width at the base.

Referring to FIGS. 1 and 3-6B, in one or more examples, the second prong 138 is bifurcated. As an example, the second prong 138 includes the arcuate recess 152. The bifurcation of the second prong 138, such as the recess 152, is configured for receiving a portion of the shank 206 of the fastener 202, between the head 204 and the surface 208, when the tool 100 is in the closed position. The bifurcation of the second prong 138, such as the recess 152, enables a portion of the second prong 138 to fit deeper into the gap formed between the head 204 of the fastener 202 and the surface 208. The bifurcation of the second prong 138, such as the recess 152, also facilitates retention of the fastener 202 between the jaws 120 after removal.

Referring to FIGS. 1 and 4-6B, in one or more examples, at least a portion of the second arm 136 of the first width 126 forms a cavity 156. The cavity 156 is configured for receiving or accommodating a portion of the head 204 of the fastener 202 when the tool 100 is in the closed position. In one or more examples, the cavity 156 has a profile shape that approximates the circumferential shape of the head 204 of the fastener 202. The cavity 156 of the second jaw 124 forms a holding pocket for the head 204 during removal of the fastener 202 and facilitates retention of the fastener 202 between the jaws 120 after removal.

Referring to FIGS. 1 and 3-8, in one or more examples, at least a portion of the first arm 132 of the first jaw 122 is at least approximately flat (e.g. has approximately planar inner and outer surfaces). In one or more examples, at least a portion of the second arm 136 of the second jaw 124 is arcuate (e.g., has curved inner and outer surfaces). In these examples, the shapes of the first arm 132 and the second arm 136 facilitate insertion of the jaws 120 in areas with limited access to the head 204 of the fastener 202 and/or where structural obstructions exist proximate to the fastener 202. In one or more examples, the arcuate shape of the second arm 136 forms the cavity 156 of the second jaw 124.

In other examples, the first jaw 122, such as one or more portions of the first saddle 146, the first arm 132, and the first prong 134, can have any suitable dimensions, profile shape, or geometry. Similarly, the second jaw 124, such as one or more portions of the second saddle 148, the second arm 136, and the second prong 138, can have any suitable dimensions, profile shape, or geometry.

Referring to FIGS. 1 and 5, in one or more examples, each one of the jaws 120 has a jaw width 172 and a jaw length 162. In one or more examples, the jaw widths 172 of the jaws 120 are at least approximately the same. In one or more examples, the jaw widths 172 of the jaws 120 are different. In one or more examples, the jaw lengths 162 of the jaws 120 are at least approximately the same.

Referring to FIG. 5, in one or more examples, the first jaw 122, such as at least a portion of the first arm 132 and the first prong 134, has a first jaw width 174. The second jaw 124, such as at least a portion of the second arm 136 and the second prong 138, has a second jaw width 176. The second jaw width 176 is greater than the first jaw width 174.

In one or more examples, the second jaw width 176 is configured to accommodate and/or receive at least a portion of the head 204 of the fastener 202. For example, the second jaw width 176 is at least approximately equal to or greater than the head width 214 of the head 204 of the fastener 202. In these examples, the second jaw width 176 of the second jaw 124 enables the second jaw 124 to sufficiently grip the head 204 of the fastener 202 during removal and hold the fastener 202 by the head 204 after removal. In these examples, the second jaw width 176 of the second jaw 124 provides the cavity 156 with a sufficient width and depth to receive at least a portion of the head 204 of the fastener 202 during removal and hold the fastener 202 by the head 204 after removal.

In one or more examples, the first jaw width 174 is configured to contact and/or engage a portion of the head 204 of the fastener 202. For example, the first jaw width 174 is less than the head width 214 of the head 204 of the fastener 202. In these examples, the first jaw width 174 of the first jaw 122 enables the first jaw 122 to fit between the head 204 of the fastener 202 and a physical obstruction located in close proximity to the head 204.

In one or more examples, the first jaw 122, such as at least a portion of the first arm 132, has a first jaw length 164. The second jaw 124, such as at least a portion of the second arm 136, has a second jaw length 166. In one or more examples, the first jaw length 164 and the second jaw length 166 are at least approximately the same.

In one or more examples, the first jaw length 164 and second jaw length 166 are configured to accommodate, engage, contact, or receive at least a portion, such as an entirety, of the head 204 of the fastener 202. For example, the first jaw length 164 and the second jaw length 166 are at least approximately equal to or greater than the head length 212 of the head 204 of the fastener 202. In these examples, the first jaw length 164 and the second jaw length 166 enable the first jaw 122 and the second jaw 124 to sufficiently grip the head 204 of the fastener 202 during removal and hold the fastener 202 by the head 204 after removal. In these examples, the first jaw length 164 and the second jaw length 166 also prevent bending of the fastener 202 during removal.

Referring again to FIGS. 1 and 3-8, in one or more examples, the end attachment 102 includes the first jaw 122 and the second jaw 124. The first jaw 122 is configured for connecting to the first lever 112 of the tool 100. The second jaw 124 is configured for connecting to the second lever 114 of the tool 100. The first jaw 122 includes the first arm 132 and the first prong 134 extending at least approximately perpendicular from the first arm 132. The second jaw 124 includes the second arm 136 and the second prong 138 extending at least approximately perpendicular from the second arm 136.

Figure 2:
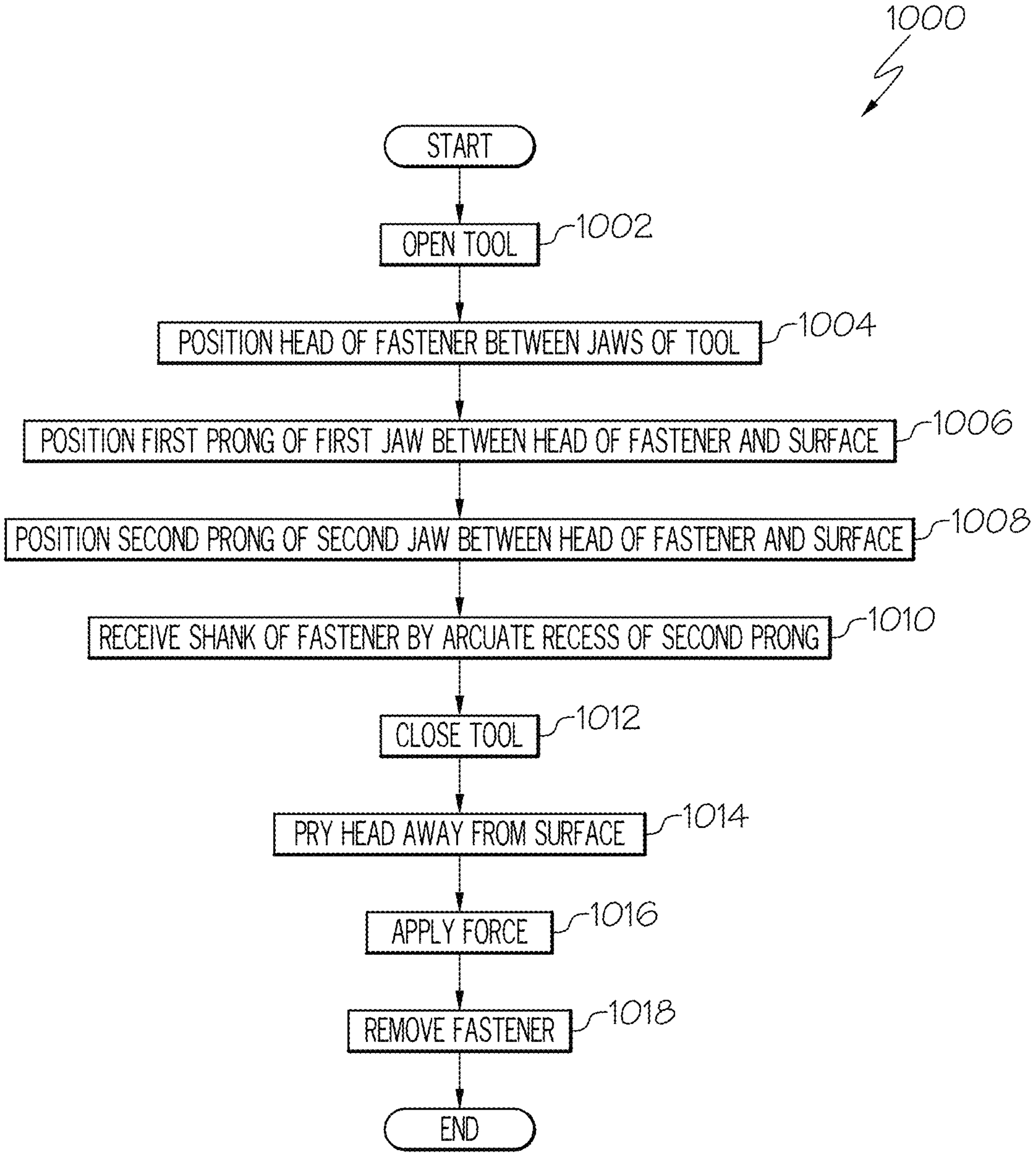
FIG. 2 is a flow diagram of an example of a method for removing a fastener.

Referring now to FIG. 2, the following are examples of the method 1000, according to the present disclosure. The method 1000 includes a number of elements, steps, operations, or processes. Not all of the elements, steps, operations, or processes described or illustrated in one example are required in that example. Some or all of the elements, steps, operations, or processes described or illustrated in one example can be combined with other examples in various ways without the need to include other elements, steps, operations, or processes described in those other examples, even though such combination or combinations are not explicitly described or illustrated by example herein.

Referring generally to FIGS. 1 and 3-8 and particularly to FIG. 2, in one or more examples, the method 1000 is implemented using the tool 100 (FIG. 1). In one or more examples, the method 1000 is implemented using the end attachment 102 (FIG. 1).

In one or more examples, the method 1000 includes a step of opening 1002 the tool 100. The method 1000 includes a step of positioning 1004 the head 204 of the fastener 202 between the first jaw 122 and the second jaw 124 of the tool 100. The method 1000 includes a step of positioning 1006 the first prong 134 of the first jaw 122 between the head 204 of the fastener 202 and the surface 208 to which the fastener 202 is fastened. The method 1000 includes a step of positioning 1008 the second prong 138 of the second jaw 124 between the head 204 of the fastener 202 and the surface 208. The method 1000 includes a step of receiving 1010 a portion of the shank 206 of the fastener 202 by the arcuate recess 152 of the second prong 138. The method 1000 includes a step of closing 1012 the tool 100. The method 1000 includes a step of prying 1014 the head 204 of the fastener 202 away from the surface 208 while positioning at least one of the first prong 134 and the second prong 138 between the head 204 of the fastener 202 and the surface 208, such as while closing the tool 100. The method 1000 includes a step of applying 1016 a force (e.g., tension or pulling force) to the tool 100. The method 1000 includes a step of removing 1018 the fastener 202 from the hole 218 in the components 216 in response to the applying the pulling force.

Figure 10:
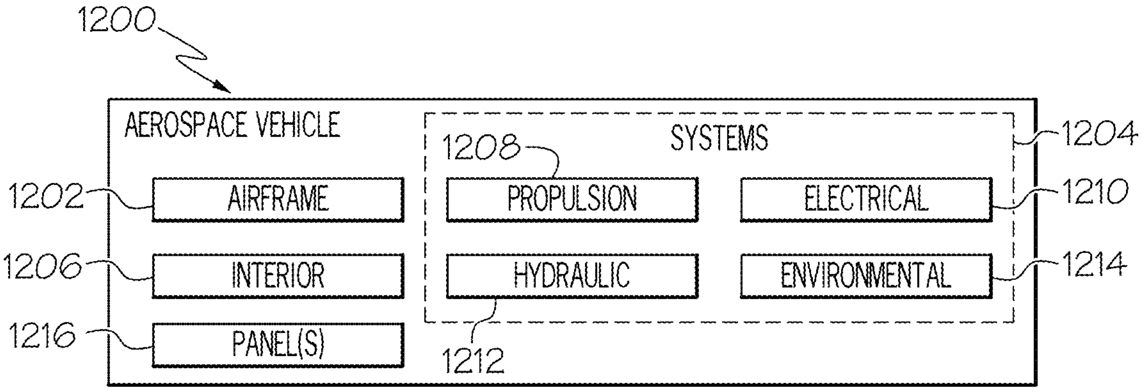
FIG. 10 is a schematic block diagram of an example of an aircraft.

Referring now to FIGS. 10 and 11, examples of the tool 100 and the method 1000 described herein, may be related to, or used in the context of, the aerospace manufacturing and service method 1100, as shown in the flow diagram of FIG. 10 and an aircraft 1200, as schematically illustrated in FIG. 11. As an example, the aircraft 1200 and/or the manufacturing and service method 1100 may include or utilize temporary fasteners that are removed using the tool 100 and/or according to the method 1000.

Aircraft structures, such as wing sections and fuselages, are often assembled by fixing sheet materials to rigid members such as spars, ribs, runners, stringers etc. As an example, in order to fix a wing-skin panel to ribs of an airframe, the wing-skin panel is placed over the ribs, aligned, and clamped securely in place. Often, a series of holes is drilled through the materials, and permanent fastenings, such as rivets, are placed and secured. For larger structures, it may not be possible to achieve accurate alignment with edge clamping technique. For the assembly of larger structures, a series of holes is drilled at selected points across the structure. Temporary fasteners (e.g., fasteners 202) are inserted into these holes to temporarily secure the component materials while further holes are drilled and/or while installing permanent fasteners. After the permanent fasteners have been placed and secured, the temporary fasteners are removed and subsequently replaced with permanent fastening.

Referring to FIG. 11, which illustrates an example of the aircraft 1200. The aircraft 1200 can be any aerospace vehicle or platform. In one or more examples, the aircraft 1200 includes the airframe 1202 having the interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to the airframe 1202 of the aircraft 1200. In yet other examples, the onboard systems 1204 also include one or more other systems 1216, such as, but not limited to, communications systems, avionics systems, software distribution systems, network communications systems, passenger information/entertainment systems, guidance systems, radar systems, weapons systems, and the like. The aircraft 1200 can have any number of components that are assembled using any number of temporary or permanent fasteners, which can be removed using tool 100 and/or according to the method 1000.

Referring to FIG. 10, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 10 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the tool 100 and the method 1000, shown and described herein, may be employed during any one or more of the stages of the manufacturing and service method 1100 shown in the flow diagram illustrated by FIG. 10. In an example, electrical connections of the aircraft 1200 can be installed using the tool 100 and/or according to the method 1000 during a portion of component and subassembly manufacturing (block 1106) and/or system integration (block 1108). Further, electrical connections of the aircraft 1200 can be installed using the tool 100 and/or according to the method 1000 while the aircraft 1200 is in service (block 1112). Also, electrical connections of the aircraft 1200 can be installed using the tool 100 and/or according to the method 1000 during system integration (block 1108) and certification and delivery (block 1110). Similarly, electrical connections of the aircraft 1200 can be installed using the tool 100 and/or according to the method 1000 while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1, 3-9 and 11, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1, 3-9 and 11, referred to above, need be included in every example and not all elements, features, and/or components described herein are necessarily depicted in each illustrative example. Accordingly, some of the elements, features, and/or components described and illustrated in FIGS. 1, 3-9 and 11 may be combined in various ways without the need to include other features described and illustrated in FIGS. 1, 3-9 and 11, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1, 3-9 and 11, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1, 3-9 and 11, and such elements, features, and/or components may not be discussed in detail herein with reference to each of FIGS. 1, 3-9 and 11. Similarly, all elements, features, and/or components may not be labeled in each of FIGS. 1, 3-9 and 11, but reference numerals associated therewith may be utilized herein for consistency.

In FIGS. 2 and 10, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 2 and 10 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the tool 100 and the method 1000 have been shown and described, modifications may occur to those skilled in the art upon reading the specification. The present application includes such modifications and is limited only by the scope of the claims.

What is claimed is:

1. A tool comprising:

a first lever comprising a first handle and a first jaw;

a second lever pivotally coupled to the first lever at a pivot joint and comprising a second handle and a second jaw, wherein:

the pivot joint has a pivot axis that resides in a first virtual pivot plane and a second virtual pivot plane that is perpendicular to the first virtual pivot plane;

the first lever and the second lever are configured for pivoting to move the first jaw and the second jaw between an open position and a closed position;

the first jaw comprises:

a first arm extending along a first longitudinal axis that is parallel to the second virtual pivot plane and comprising a first arm base connected to the first lever and a first arm end opposite the first arm base along the first longitudinal axis, wherein, along a first virtual arm plane that is perpendicular to the second virtual pivot plane, the first arm base is wider than the first arm end; and a first prong extending from the first arm end along a first virtual prong plane that is at least approximately perpendicular to the first longitudinal axis of the first arm, wherein the first prong is wedge-shaped, in cross section when viewed in a direction parallel to the first virtual prong plane, tapers inwardly along the first virtual prong plane from a larger dimension at a first prong base to a to a smaller dimension at a first prong tip, and has a shape of a trapezoid with the first base being arcuate, when viewed along the first longitudinal axis; and the second jaw comprises:

a second arm extending along a second longitudinal axis that is parallel to the second virtual pivot plane and comprising a second arm base and a second arm end opposite the second arm base along the second longitudinal axis; and a second prong extending from the second arm end along a second virtual prong plane that is at least approximately perpendicular to the second longitudinal axis of the second arm, wherein the second prong is wedge-shaped, in cross section when viewed in a direction parallel to the second virtual prong plane, tapers inwardly along the second virtual prong plane from a larger dimension at a second prong base to smaller dimension at a second prong tip, and comprises an arcuate recess along the second virtual prong plane extending from the second tip toward the second base.

2. The tool of claim 1, wherein:

the first jaw is coupled to and removable from the first handle; and the second jaw is coupled to and removable from the second handle.

3. The tool of claim 1, wherein the second prong is bifurcated to form the arcuate recess.

4. The tool of claim 1, wherein the first arm is flat along the first longitudinal axis within the first virtual arm plane.

5. The tool of claim 1, wherein the second arm is arcuate about the second longitudinal axis within a second virtual arm plane that is perpendicular to the second virtual pivot plane.

6. The tool of claim 5, wherein a radius of curvature of the second arm is on an axis that is parallel to or coincident with the second longitudinal axis.

7. The tool of claim 1, further comprising ribs extending along the first longitudinal axis of the first arm.

8. The tool of claim 1, wherein the second arm forms a cavity extending along the second longitudinal axis and configured for receiving a portion of a head of a fastener.

9. The tool of claim 1, wherein:

the first jaw has a first jaw width dimension perpendicular to the first longitudinal axis;

the second jaw has a second jaw width dimension perpendicular to the second longitudinal axis; and the second jaw width dimension is greater than the first jaw width dimension.

10. The tool of claim 1, wherein, in the closed position, the first arm and the second arm are at least approximately parallel to one another.

11. The tool of claim 1, wherein the arcuate recess is semi-circular.

12. The tool of claim 1, wherein the first jaw is coupled to the first handle.

13. The tool of claim 1, wherein the second jaw is coupled to the second handle.

14. An end attachment for a tool having a first lever pivotally coupled to a second lever at a pivot joint having a pivot axis that resides in a first virtual pivot plane and a second virtual pivot plane that is perpendicular to the first virtual pivot plane, the end attachment comprising:

a first jaw configured for connecting to the first lever of the tool; and a second jaw configured for connecting to the second lever of the tool, wherein:

the first jaw comprises:

a first arm extending along a first longitudinal axis that is parallel to the second virtual pivot plane when coupled to the tool and comprising a first arm base and a first arm end opposite the first arm base along the first longitudinal axis, wherein, along a first virtual arm plane that is perpendicular to the second virtual pivot plane, the first arm base is wider than the first arm end; and a first prong extending from the first arm end along a first virtual prong plane that is at least approximately perpendicular to the first longitudinal axis of the first arm, wherein the first prong is wedge-shaped, in cross section when viewed in a direction parallel to the first virtual prong plane, tapers inwardly along the first virtual prong plane from a larger dimension at a first prong base to a to a smaller dimension at a first prong tip, and has a shape of a trapezoid with the first base being arcuate, when viewed along the first longitudinal axis; and the second jaw comprises:

a second arm extending along a second longitudinal axis that is parallel to the second virtual pivot plane when coupled to the tool and comprising a second arm base and a second arm end opposite the second arm base along the second longitudinal axis; and a second prong extending from the second arm end along a second virtual prong plane that is at least approximately perpendicular to the second longitudinal axis of the second arm, wherein the second prong is wedge-shaped, in cross section when viewed in a direction parallel to the second virtual prong plane, tapers inwardly along the second virtual prong plane from a larger dimension at a second prong base to smaller dimension at a second prong tip, and comprises an arcuate recess along the second virtual prong plane extending from the second tip toward the second base.

15. The end attachment of claim 14, wherein the second prong is bifurcated to form the arcuate recess.

16. The end attachment of claim 14, wherein the first arm is flat along the first longitudinal axis within the first virtual arm plane.

17. The end attachment of claim 14, wherein:

the first jaw has a first width dimension perpendicular to the first longitudinal axis;

the second jaw has a second width dimension perpendicular to the second longitudinal axis; and the second width dimension is greater than the first width dimension.

18. The end attachment of claim 14, wherein:

the first jaw further comprises a first saddle at the first arm base configured for connecting to a first tip of the first lever; and the second jaw further comprises a second saddle at the second arm base configured for connecting to a second tip of the second lever.

19. The end attachment of claim 14, wherein the arcuate recess is semi-circular.

20. The end attachment of claim 14, wherein the second arm is arcuate about the second longitudinal axis within a second virtual arm plane that is perpendicular to the second virtual pivot plane when coupled to the tool.

* * * * *